US009747188B2

(12) United States Patent
Srivastava

(10) Patent No.: US 9,747,188 B2
(45) Date of Patent: *Aug. 29, 2017

(54) DETERMINING IMPORTANCE OF AN ARTIFACT IN A SOFTWARE DEVELOPMENT ENVIRONMENT

(71) Applicant: International Business Machines Corporation, Armonk, NY (US)

(72) Inventor: Vaibhav Srivastava, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/884,099

(22) Filed: Oct. 15, 2015

(65) Prior Publication Data
US 2016/0283349 A1    Sep. 29, 2016

Related U.S. Application Data

(63) Continuation of application No. 14/670,712, filed on Mar. 27, 2015.

(51) Int. Cl.
*G06F 11/36* (2006.01)
*G06F 9/44* (2006.01)

(52) U.S. Cl.
CPC ............ *G06F 11/3612* (2013.01); *G06F 8/70* (2013.01); *G06F 11/368* (2013.01)

(58) Field of Classification Search
CPC .................................. G06F 8/70; G06F 11/368
USPC ......................................................... 717/101
See application file for complete search history.

(56) References Cited

U.S. PATENT DOCUMENTS

| 5,631,857 | A | * | 5/1997 | Kobrosly | ....... G01R 31/318342 |
| | | | | | 702/108 |
| 7,480,900 | B1 | * | 1/2009 | Zhou | ................... G06F 11/3676 |
| | | | | | 717/132 |
| 7,490,319 | B2 | | 2/2009 | Blackwell et al. | |
| 7,747,987 | B1 | * | 6/2010 | Akarte | ................ G06F 11/3688 |
| | | | | | 717/131 |
| 8,151,248 | B1 | | 4/2012 | Butler et al. | |
| 8,527,813 | B2 | | 9/2013 | Budnik et al. | |
| 2005/0125772 | A1 | * | 6/2005 | Kohno | ....................... G06F 8/70 |
| | | | | | 717/104 |

(Continued)

FOREIGN PATENT DOCUMENTS

| CN | 102831055 A | 12/2012 |
| IN | 3114/CHE/2014 A | 7/2014 |
| WO | 2013139081 A1 | 9/2013 |

OTHER PUBLICATIONS

Elbaum et al., "Prioritizing Test Cases for Regression Testing", presented in International Symposium of Software Testing and Analysis, 102-112, Aug. 2000.

(Continued)

*Primary Examiner* — Ryan Coyer
(74) *Attorney, Agent, or Firm* — Maeve Carpenter

(57) ABSTRACT

In an approach to determining an importance value of an artifact in a collaborative software development environment, a computer determines a snapshot of a collaborative software development environment, wherein the snapshot includes an artifact and at least one relationship between the artifact and one or more nodes in one or more hierarchical levels. The computer then determines, based, at least in part, on the snapshot, a plurality of parameters for the artifact in the collaborative software development environment. The computer calculates, based, at least in part, on the plurality of parameters, an importance value of the artifact.

8 Claims, 6 Drawing Sheets

(56) References Cited

U.S. PATENT DOCUMENTS

| | | | | |
|---|---|---|---|---|
| 2009/0313609 | A1* | 12/2009 | Ackerman | G06F 8/36 717/127 |
| 2010/0063785 | A1* | 3/2010 | Pich | G06K 9/6251 703/6 |
| 2012/0266023 | A1 | 10/2012 | Brown et al. | |
| 2013/0047140 | A1* | 2/2013 | Shann | G06F 11/3664 717/128 |
| 2014/0136557 | A1* | 5/2014 | Lilienthal | G06F 17/153 707/754 |
| 2014/0143332 | A1* | 5/2014 | Garg | H04L 67/306 709/204 |
| 2015/0242304 | A1* | 8/2015 | Akbulut | G06F 3/04842 714/38.1 |

OTHER PUBLICATIONS

Muthusamy et al., "A Test Case Prioritization Method with Weight Factors in Regression Testing Based on Measurement Metrics", International Journal of Advanced Research in Computer Science and Software Engineering, vol. 3, Issues 12, pp. 390-396, Dec. 2013.

Roongruangsuwan et al., "Test Case Prioritization Techniques", Journal of Theoretical and Applied Information Technology, pp. 45-60, © 2005-2010 JATIT & LLS.

Srikanth et al., "System Test Case Prioritization of New and Regression Test Cases", Downloaded on Dec. 24, 2014, 10 pages, <http://collaboration.csc.ncsu.edu/laurie/Papers/PORT_ISESE.pdf>.

Qu et al., "Combinatorial Interaction Regression Testing: A Study of Test Case Generation and Prioritization", downloaded on Dec. 24, 2014, 10 pages, <http://cse.unl.edu/~myra/papers/quICSM.pdf>.

U.S. Appl. No. 14/670,712, filed Mar. 27, 2015, Entitled "Determining Importance of an Artifact in a Software Development Environment".

Appendix P.: List of IBM Patents or Patent Applications Treated as Related, filed herewith, 2 pages.

* cited by examiner

DETERMINING IMPORTANCE OF AN ARTIFACT IN A SOFTWARE DEVELOPMENT ENVIRONMENT

BACKGROUND OF THE INVENTION

The present invention relates generally to the field of software development and testing, and more particularly to determining an importance of an artifact, such as a test case or a defect, in a software development environment, based on parameters available within the environment.

Development of a software system may go through a number of phases that include requirement gathering, system development, testing, and acceptance. Each phase may comprise a number of sub-phases. For example, the testing phase may include test planning, test case generation, test plan execution, and test result analysis. During the testing phase, the objective of a test case is to fail during execution and thereby indicate that a potential illegal behavior of the system was uncovered. Within a test run a collection of test cases is planned to be executed against a specific version of the system under test (SUT).

In each of the software development phases, a multitude of artifacts may be created, for example, artifacts related to the testing phase may include test cases, defect records, analysis results, and change requests. There may be a variety of software defects, for example, failure of a designed function, a missing function, or presence of a removed function. Management of the software defects is part of the software development lifecycle and may involve artifacts from different phases of the software development. The artifacts may be stored in various databases to facilitate management of the artifacts.

SUMMARY

Embodiments of the present invention provide a method, a computer program product and a computer system for determining an importance value of an artifact in a collaborative software development environment. The method includes a computer determining a snapshot of a collaborative software development environment, wherein the snapshot includes an artifact and at least one relationship between the artifact and one or more nodes in one or more hierarchical levels. The computer then determines, based, at least in part, on the snapshot, a plurality of parameters for the artifact in the collaborative software development environment. The computer calculates, based, at least in part, on the plurality of parameters, an importance value of the artifact.

DETAILED DESCRIPTION

In a collaborative software development environment, such as an Application Lifecycle Management (ALM) environment, test cases may be linked to corresponding requirements, however, a determination of risk and priorities of each test case, or an importance of a defect associated with the test case, is performed manually and based on user input. A user testing a scenario may not have background on the importance of a test case. Embodiments of the present invention recognize that in a collaborative software development environment, such as an ALM environment, it is possible to determine the importance of test cases and defects based on various parameters, including, for example, a linking between artifacts.

Figure 1:
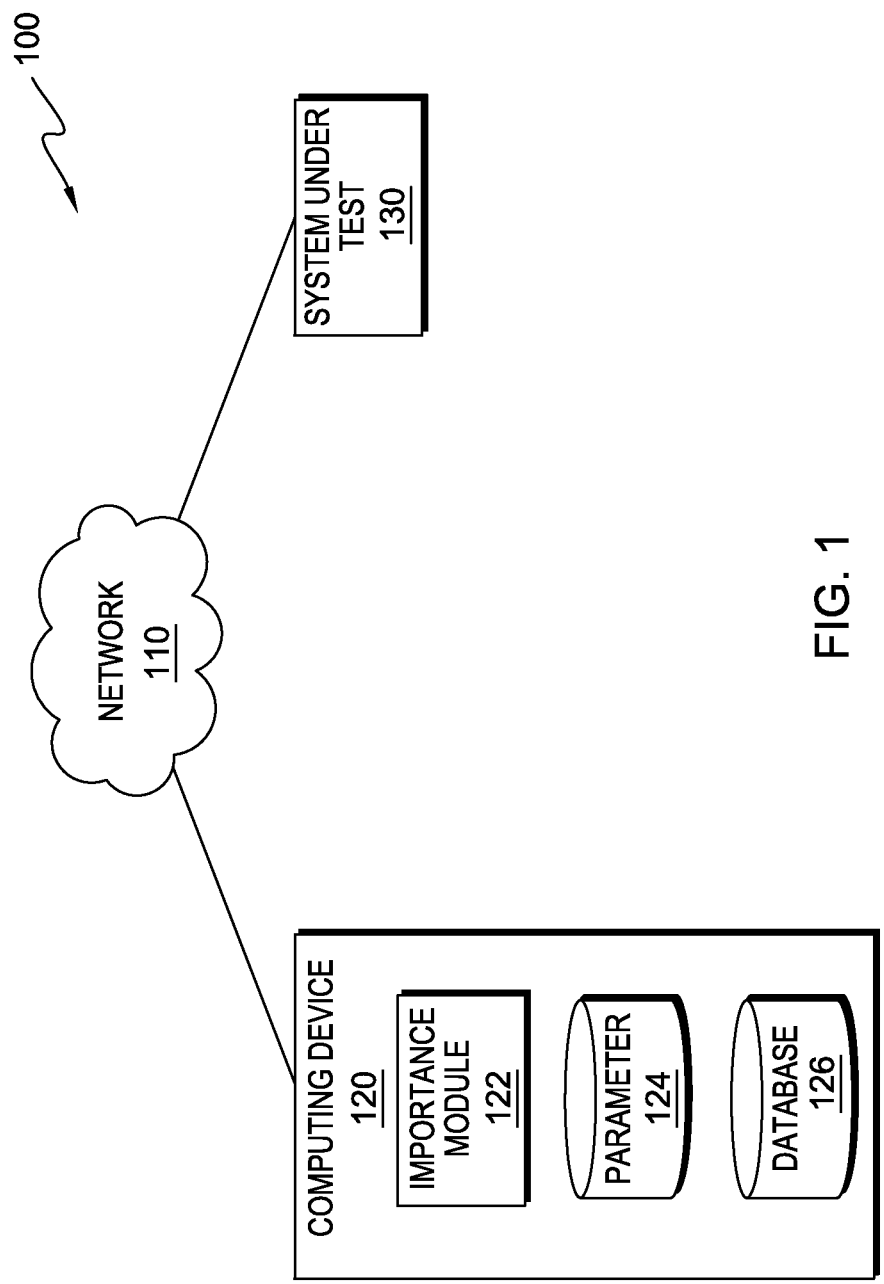
FIG. 1 is a functional block diagram illustrating a data processing environment, in accordance with an embodiment of the present invention.

The present invention will now be described in detail with reference to the Figures. FIG. 1 is a functional block diagram illustrating a data processing environment, generally designated 100, in accordance with one embodiment of the present invention. In an exemplary embodiment, data processing environment 100 is a collaborative software development environment. FIG. 1 provides only an illustration of one implementation and does not imply any limitations with regard to the environments in which different embodiments may be made by those skilled in the art without departing from the scope of the invention as recited by the claims.

Data processing environment 100 includes computing device 120 and system under test (SUT) 130, interconnected via network 110. Network 110 can be, for example, a telecommunications network, a local area network (LAN), a wide area network (WAN), such as the Internet, or a combination of the three, and can include wired, wireless, or fiber optic connections. Network 110 may include one or more wired and/or wireless networks that are capable of receiving and transmitting data, voice, and/or video signals, including multimedia signals. In general, network 110 can be any combination of connections and protocols that will support communications between computing device 120, SUT 130, and other computing devices (not shown) within data processing environment 100.

In various embodiments, computing device 120 can be a laptop computer, a tablet computer, a mobile computing device, a smartphone, a personal computer, a desktop computer, or any programmable electronic device capable of communicating with SUT 130 via network 110, and with various components and devices (not shown) within data processing environment 100. Computing device 120 can be a server computer, a standalone computing device, a management server, a web server, or any other computing system capable of receiving, sending, and processing data. In other embodiments, computing device 120 can represent a server computing system utilizing multiple computers as a server system. In another embodiment, computing device 120 represents a computing system utilizing clustered computers and components (e.g., database server computers, application server computers, etc.) that act as a single pool of seamless resources when accessed within data processing environment 100. Computing device 120 includes importance module 122, parameter database 124, and database 126. In various embodiments, each of the programs and databases included on computing device 120 may be located elsewhere within data processing environment 100 with access to computing device 120 and SUT 130 via network 110. Computing device 120 may include internal and external hardware components, as depicted and described with reference to FIG. 4.

Importance module 122 determines an importance of an artifact, such as a test case, or a defect, in a collaborative software development environment, for example, data processing environment 100, based on a plurality of parameters associated with the artifact and the system being tested. Using the plurality of parameters, which may include, for example, constant and dynamic attributes, importance module 122 calculates an importance value for each entity associated with an artifact. The entities associated with an artifact may include, for example, requirement and development tasks, and the importance values for each entity are used to determine an importance value for the artifact.

In FIG. 1, parameter database 124 and database 126 reside on computing device 120. A database is an organized collection of data. Parameter database 124 and database 126 can be implemented with any type of storage device capable of storing data that can be accessed and utilized by computing device 120, such as a database server, a hard disk drive, or a flash memory. In other embodiments, parameter database 124 and database 126 can represent multiple storage devices within data processing environment 100 or within computing device 120. In some embodiments, parameter database 124 and database 126 can reside on separate computing devices within data processing environment 100, provided they are accessible to each other and importance module 122 via network 110.

Parameter database 124 stores various parameters associated with artifacts, and information regarding any links between the artifacts and upstream entities, such as testing requirements or development items. In an embodiment, the parameters are divided into three categories, primary, secondary and tertiary. Primary parameters have a direct impact on an artifact, for example, a number of requirements linked to a test case, secondary parameters have an indirect impact, for example, a number of secondary requirements linked to a requirement, and tertiary parameters have an environmental impact, for example, an importance of a customer asking for a requirement. The various parameters stored in parameter database 124 include both constant and dynamic attributes, for example, constant attributes may include an artifact type and a customer importance, while dynamic attributes may include a number of customers on a requirement and a number of comments on the requirement. Parameters may be determined at configuration of SUT, or may be retrieved from the SUT at any point in time, and may be automatically updated based on changes occurring in the system.

Database 126 stores artifacts generated during software development and testing of a system under test, such as SUT 130. Database 126 also stores importance values calculated for various artifacts, including test cases and defects, by importance module 122.

SUT 130 is a system being tested within a software development environment, such as data processing environment 100, for correct operation. In other embodiments, SUT 130 may be an application under test, or a device under test. While depicted in FIG. 1 as a single SUT, in various embodiments, SUT 130 may represent one, or a plurality of computing systems.

Figure 2:
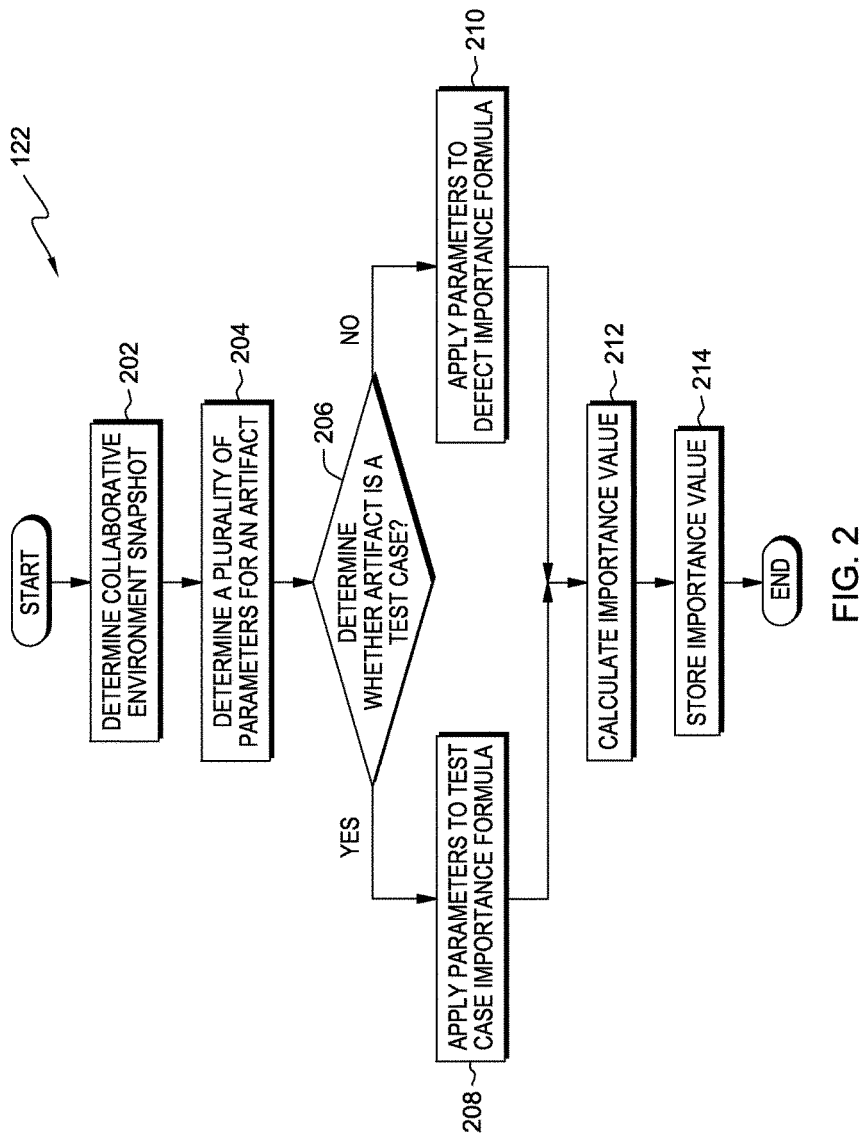
FIG. 2 is a flowchart depicting operational steps of an importance module, for determining an importance of an artifact in a collaborative software development environment, in accordance with an embodiment of the present invention.

FIG. 2 is a flowchart depicting operational steps of importance module 122 for determining an importance of an artifact in a collaborative software development environment, in accordance with an embodiment of the present invention.

Importance module 122 determines a collaborative environment snapshot (202). The collaborative environment snapshot is a snapshot taken of the SUT, for example, SUT 130 at a moment in time. The snapshot can depict one or more artifacts, such as a test case or defect, and entities associated with each artifact, such as requirement tasks and development tasks associated with a test case. The snapshot can include a hierarchical relationship between the entities. For example, for an artifact such as a test case or a defect, the snapshot can show the associated upstream entities, such as a development task or a requirement task, and links between each hierarchical level of the upstream entities. In an embodiment, each entity is represented as a node in the collaborative environment snapshot. An example of a collaborative environment snapshot is depicted and discussed with reference to FIG. 3A.

Importance module 122 determines a plurality of parameters for an artifact (204). In an embodiment, importance module 122 determines parameters for each artifact in data processing environment 100. In other embodiments, a user determines a configuration which may limit one or more artifacts to be evaluated, and importance module 122 therefore determines the parameters associated with the one or more artifacts to be evaluated. A parameter may be determined to be not useful, and therefore a user can set the parameter to zero, thereby eliminating the parameter for the importance value calculation. The user may input the configuration via a user interface, for example, a user interface of computing device 120. In various embodiments, each of the plurality of parameters can be associated with a hierarchical level of each upstream entity corresponding to an artifact. The plurality of parameters may include each of primary, secondary, and tertiary parameters associated with the artifact.

In an exemplary embodiment, the plurality of parameters includes at least two sets of attributes, where one set is constant, and one set is dynamic. In an embodiment, the constant attributes are configurable by a user. Constant attributes may include, for example, "ac" which is a constant corresponding to each specific customer, "ah" which is a constant corresponding to a heat value, or a number of recent comments, "Nf", a normalization factor, "Mf", a multiplication factor, and ATf, an artifact factor. Dynamic attributes may include, for example, "noc", a number of customers, and "noh", a number of comments, which may vary based on a time at which the artifact is being evaluated. In various embodiments, importance module 122 determines dynamic attributes from the SUT during operation of the importance module 122 or during another testing period.

Importance module 122 determines whether the artifact is a test case (206). If the artifact is a test case ("yes" branch, 206), then importance module 122 applies the plurality of parameters to a test case importance formula (208). A test case, as known in the art, is a set of conditions under which a tester can determine whether an application or computing component is functioning as designed. The test case importance formula is represented by formula (1) in Table 1. Each importance value used to calculate a test case importance value, $I_T$ is determined based on parameter values associated with, for example, upstream entities such as requirement tasks ($I_{REQ}$), development tasks ($I_{DEV}$), defects ($I_{DEF}$), and environmental and statistical parameters ($I_{EnvStat}$). Environmental and statistical parameters are typically constant, and may include a number of co-located test cases being executed, or a customer importance for a platform. In various embodiments, each entity, including requirement tasks, development tasks, defects, etc. can be linked to a test case directly or indirectly. If linked directly, a requirement is linked to the test case. If linked indirectly, a first requirement can be linked to a second requirement, which is linked to the test case.

Table 1: Test Case Importance Formula $$I_T = I_{REQ} + I_{DEV} + I_{DEF} + I_{EnvStat} \quad (1)$$

If the artifact is not a test case ("no" branch, 206), then importance module 122 applies the plurality of parameters to a defect importance formula (210). A defect encountered during software testing is an error, or fault, in a computer program or system that causes the program or system to produce an incorrect or unexpected result. A defect importance value can be calculated similarly to a test case importance value, for example, using formula (2) in Table 2. In various embodiments, importance module 122 may apply a plurality of formulas, not limited to a test case importance formula or a defect importance formula.

Table 2: Defect Importance Formula $$I_D = (I_T * AT f) + I_{DEV} + I_{RelDef} \quad (2)$$

After applying the plurality of parameters to either the test case importance formula, or the defect importance formula, importance module 122 calculates a respective importance value (212) and stores the calculated importance value (214). An example of a test case importance value calculation is depicted and discussed in FIGS. 3A, 3B, and 3C. The calculated importance values can be stored in database 126 for comparison with other importance values. An importance of an artifact, for example, a test case, is determined relative to other test cases, based, at least in part, on the calculated importance values of each test case.

Figure 3A:
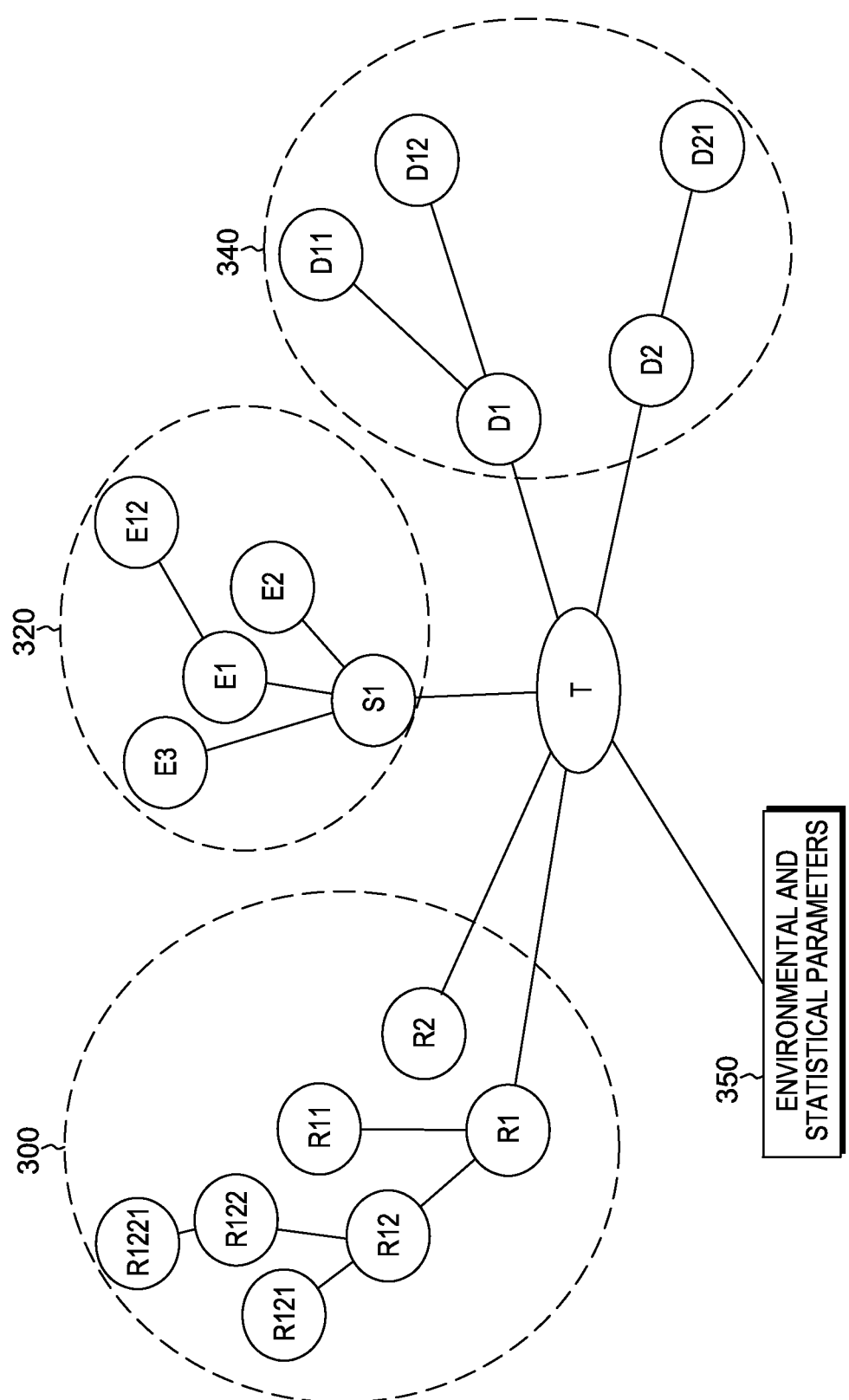
FIGS. 3A, 3B, and 3C depict an exemplary application of processes of the importance module of FIG. 2, in accordance with an embodiment of the present invention.
Figure 3B:
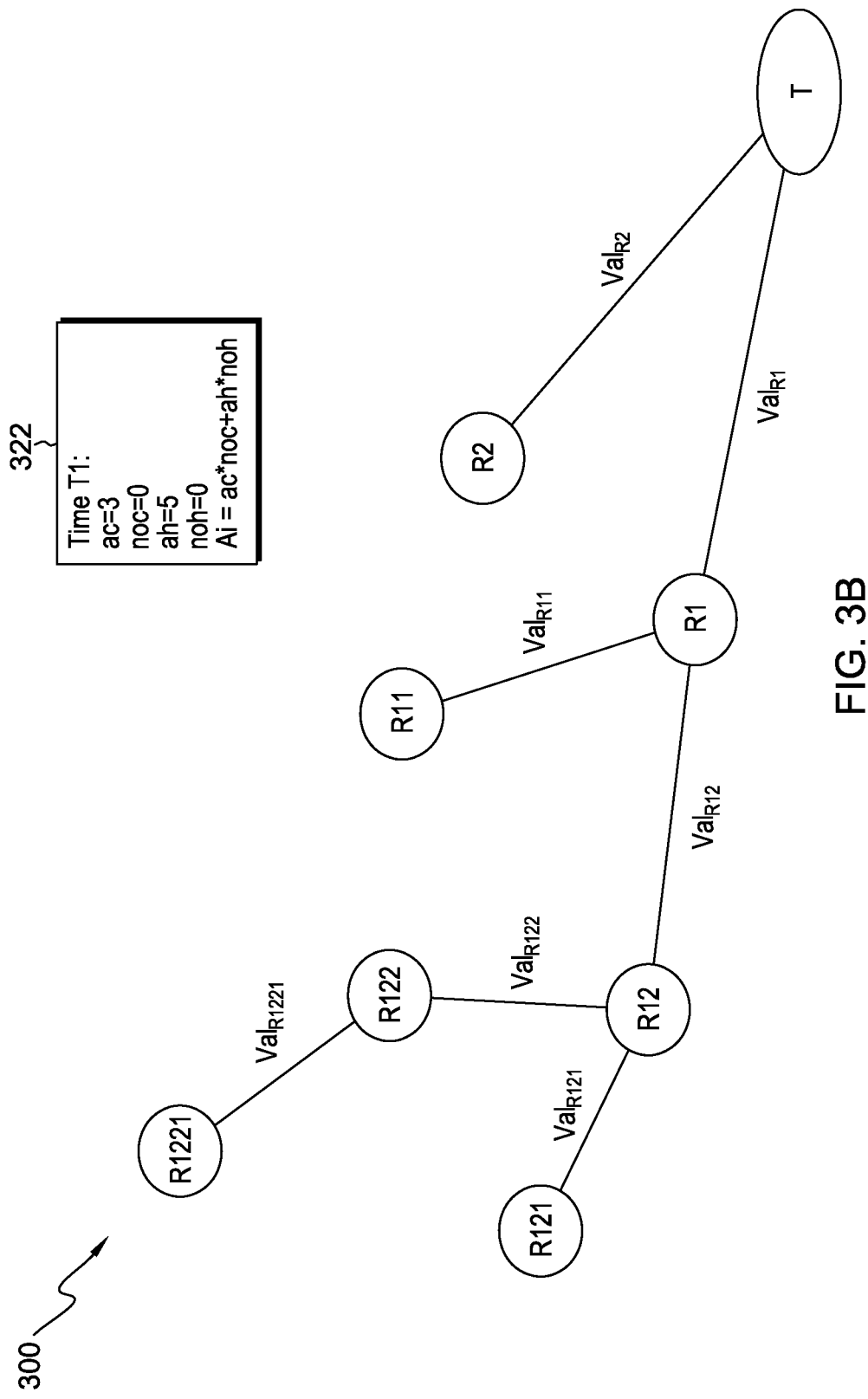
Figure 3C:
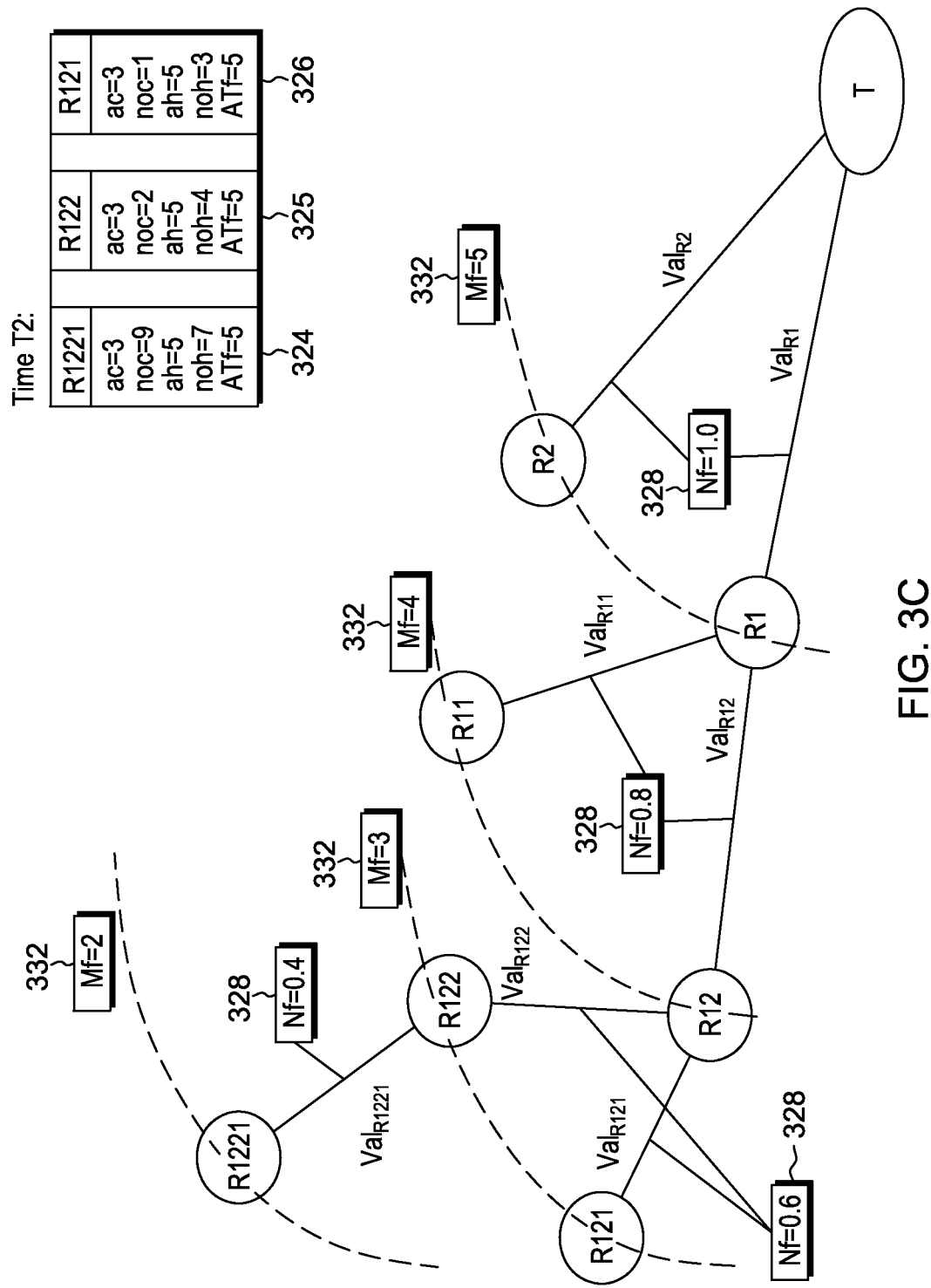

FIGS. 3A, 3B, and 3C depict an exemplary application of the processes of importance module 122 as discussed with reference to FIG. 2, in accordance with an embodiment of the present invention.

FIG. 3A depicts a collaborative environment snapshot for a test case, T, as discussed at (202) above. The collaborative environment snapshot includes upstream entities for the test case artifact, as indicated by portions 300, 320, and 340. The portion of the snapshot circled and indicated by 300, is shown and discussed further in FIG. 3B. Portion 300 includes hierarchical requirement task relationships and nodes linked by the relationships, the requirement tasks including, for example, number of customers, comments, subscribers, and a priority of the requirement. Portion 320 represents development task relationships and nodes linked by the relationships, for example, 'S' is a story and 'E' is an enhancement task. Portion 340 shows defects, for example, when regression testing is performed when defects created in a previous run of the test case are not resolved, and therefore feed back into the importance value calculation of the test case. Portion 350 shows environmental and statistical parameters, for example, history of the collaborative environment and importance of the platform being tested. Environmental and statistical parameters are typically constant values used for inputs in the importance value calculations.

FIG. 3B depicts a portion 300 of the collaborative environment snapshot at time T1. The snapshot portion 300 includes the artifact, T, and depicts at least one relationship between the artifact and one or more nodes upstream of the artifact in various hierarchical levels. Portion 300 depicts requirement task relationships, indicated by R1221, R121, R122, R12, R11, R1, and R2. An importance value calculated at each hierarchical level for each requirement task, $Val_R$, is linked to each other importance value, shown by formulas (3a)-(3g) in Table 3. In order to determine an importance value for a requirement task, for example, $Val_{R1}$, each of the linked upstream nodes, or requirements, are included, as indicated by formula (3a)-(3f) in Table 3. Due to consideration of downstream requirements, parameters such as a normalization factor, Nf, which takes into account a degree of variance, and a multiplication factor, Mf, accounting for a distance from the artifact (i.e., as the distance increase, the importance decreases), are incorporated into the requirement task importance value calculations. In various embodiments, an administrator or user can configure a hierarchical level at which importance module 122 is to run. For example, a system may have relationships present up to nine hierarchical levels, however, the administrator may configure importance module 122 to run to five levels. In such a situation, Mf is set to zero for levels greater than five, and the Item Attribute Constant, Ai, for those levels not be taken into account.

Table 3: Importance Value Formulas $$Val_{R1221} = (Ai_{R1221} * Mf) * Nf \quad (3a)$$

$$Val_{R122} = [Val_{R1221} + (Ai_{R122} Mf)] * Nf \quad (3b)$$

$$Val_{R121} = (Ai_{R121} * Mf) * Nf \quad (3c)$$

$$Val_{R12} = [Val_{R122} + Val_{R121} + (Ai_{R12} * Mf)] * Nf \quad (3d)$$

$$Val_{R11} = (Ai_{R11} * Mf) * Nf \quad (3e)$$

$$Val_{R1} = [Val_{R12} + Val_{R11} + (Ai_{R1} * Mf)] * Nf \quad (3f)$$

$$Val_{R2} = (Ai_{R2} * Mf) * Nf \quad (3g)$$

Also depicted in FIG. 3B, in box 322, are example attribute values at time T1. At time T1, a configuration is determined and constant attributes, ac and ah are set, for example, by a user, and there are no customers or comments, so that dynamic attributes noc and noh are zero. The constant attributes ac and ah are associated with parameters that define the importance of an individual artifact. Using formula (4) in Table 4, an Item Attribute Constant, Ai, is calculated at time T1 as zero. The Item Attribute Constant is calculated for each requirement task, and used in formulas (3a)-(3g) above to calculate the importance value at each hierarchical level. While attributes ac and ah are discussed by way of example, various embodiments of the present invention include a plurality of attributes, including, for example, a priority of an artifact, a severity of an artifact, a number of active reviewers for an artifact, or a number of subscribers to an artifact.

Table 4: Item Attribute Constant Formula $$Ai = (ac * noc) + (ah * noh) \quad (4)$$

FIG. 3C depicts the portion of the collaborative environment snapshot of requirement tasks at time T2. At time T2, box 324 includes example attribute values to describe the state of node R1221, box 325 describes the state of node R122, and box 326 describes the state of node R121. For each requirement, the constants ac and ah remain the same, while the noc and noh values can vary per requirement task. The same situation applies to the hierarchy used in the calculation of the development task importance value and the defect importance value, with reference to the snapshot shown in FIG. 3A. In FIG. 3C, boxes 328 represent the normalization factor, Nf, for each hierarchical level, and boxes 332 represent the multiplication factor, Mf, for each hierarchical level. The values in boxes 328 and 332 are determined at configuration, for example, by a user.

In an example calculation for Formula 3a, at R1221, the importance value, $Val_{R1221}=(Ai_{R1221}*Mf)*Nf$, using Mf=2, and Nf=0.4 as shown in FIG. 3C, $Val_{R1221}$ is equal to {[(3*9)+(5*7)]*2*0.4}, calculated to a value of 49.6. Using formulas (3a)-(3g) importance values at each hierarchical level are calculated, and formula (5) as shown in Table 5, is used to calculate $I_{REQ}$. At time T1, $I_{REQ}$, calculated using formula (4), is equal to zero. The Artifact Factor, ATf, in formula (4), varies for each artifact type, for example, for a requirement task, ATf may be equal to five, and for a story type task, ATf may be equal to 8. The value, ATf, is pre-determined for each artifact, either, for example, a default value, or configured by a user. In the exemplary embodiment depicted in FIG. 3C, at time T2, assuming an ATf of 5, $I_{REQ}$, is calculated. Importance module 122 then calculates an importance value for each entity in the software development environment, including, for example, development tasks, $I_{DEV}$, environmental and statistical parameters, $I_{EnvStat}$, and defects, $I_{DEF}$, and uses each value in formula (1), to determine the importance of the test case T. As per (214) above, the importance value is stored in order to compare with other test case importance values to determine a relative importance of each test case.

Table 5: Importance Value Formula $$I_{REQ}=[ATf*(ValR2+ValR1)] \quad (5)$$

In various embodiments, importance module 122 determines the current state of the system, for example, whether additional nodes are added in the hierarchy, or whether existing nodes are removed. At a time T3 then, importance module 122 determines parameters for the additional nodes and calculates the importance value for the artifact based on the parameters for the additional nodes. In other embodiments, importance module 122 may be configured to run at regular time intervals, for example, an event based update, i.e., when a change occurs in the state of hierarchical relationships.

Figure 4:
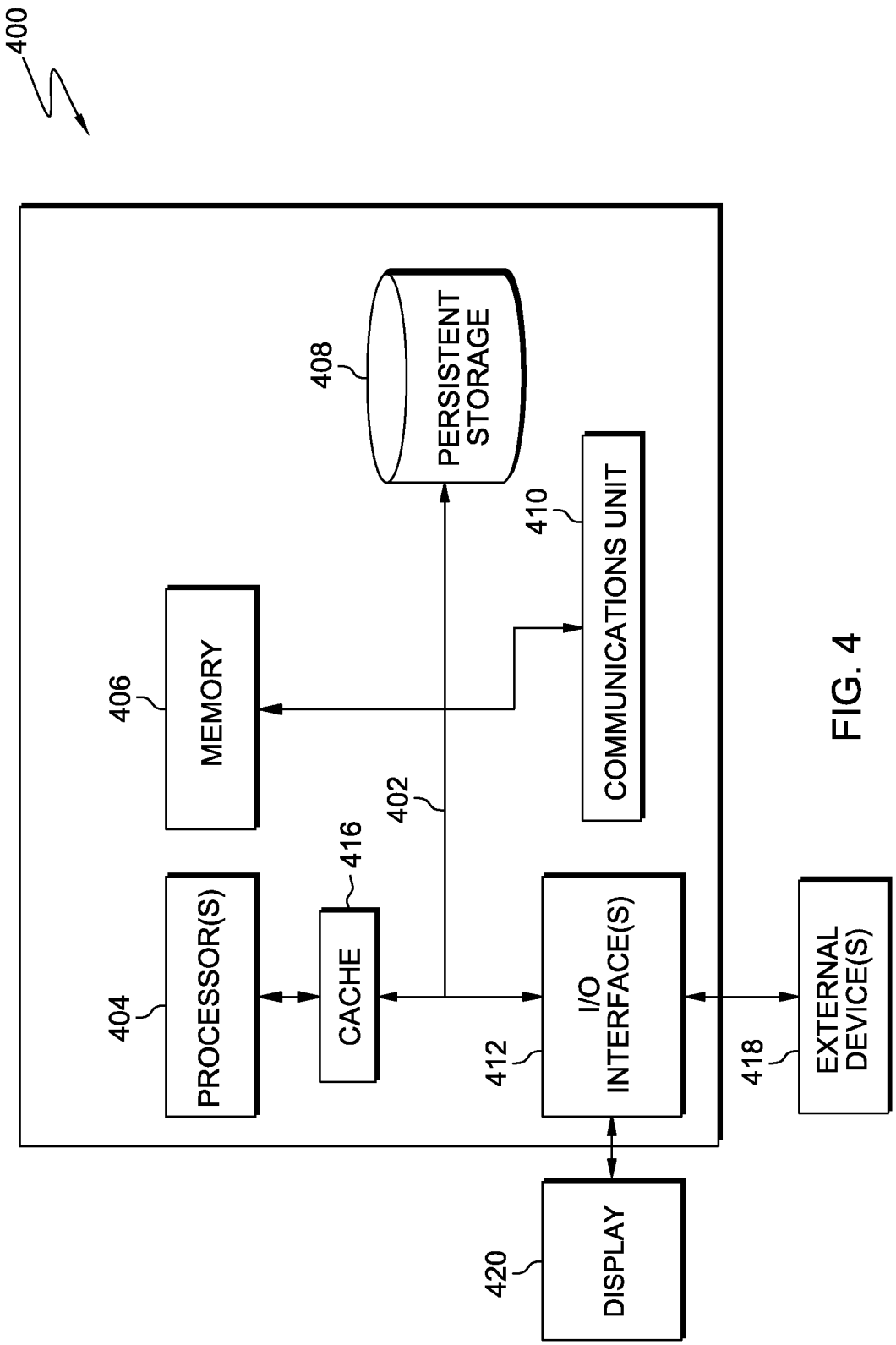
FIG. 4 is a block diagram of components of a data processing system, such as the computing device of FIG. 1, in accordance with an embodiment of the present invention.

FIG. 4 depicts a block diagram of components of a computer system 400, which is an example of a system such as computing device 120 of FIG. 1, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computer system 400 includes computer processor(s) 404, cache 416, memory 406, persistent storage 408, communications unit 410, input/output (I/O) interface(s) 412, and communications fabric 402. Communications fabric 402 provides communications between computer processor(s) 404, memory 406, persistent storage 408, communications unit 410, I/O interface(s) 412, and cache 416. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM). In general, memory 406 can include any suitable volatile or non-volatile computer readable storage media. Cache 416 is a memory that enhances the performance of computer processor(s) 404 by storing recently accessed data, and data near accessed data, from memory 406.

Program instructions and data used to practice embodiments of the present invention, for example, importance module 122, parameter database 124, and database 126, can be stored in persistent storage 408 for execution and/or access by one or more of the respective computer processor(s) 404 via cache 416. In this embodiment, persistent storage 408 includes a magnetic hard disk drive. Alternatively, or in addition to a magnetic hard disk drive, persistent storage 408 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including, for example, with SUT 130 within data processing environment 100. In these examples, communications unit 410 includes one or more network interface cards. Communications unit 410 may provide communications through the use of either or both physical and wireless communications links. Program instructions and data used to practice embodiments of the present invention may be downloaded to persistent storage 408 through communications unit 410.

I/O interface(s) 412 allows for input and output of data with other devices that may be connected to computing device 120. For example, I/O interface(s) 412 may provide a connection to external device(s) 418 such as a keyboard, a keypad, a touch screen, and/or some other suitable input device. External device(s) 418 can also include portable computer readable storage media such as, for example, thumb drives, portable optical or magnetic disks, and memory cards. Software and data used to practice embodiments of the present invention can be stored on such portable computer readable storage media and can be loaded onto persistent storage 408 via I/O interface(s) 412. I/O interface(s) 412 also connect to a display 420. Display 420 provides a mechanism to display data to a user and may be, for example, a computer monitor or an incorporated display screen, such as is used, for example, in tablet computers and smart phones.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for determining an importance value of a test case in a collaborative software development environment, the method comprising:

determining, by one or more computer processors, a snapshot of a collaborative software development environment, wherein the snapshot includes a test case and at least one relationship between the test case and one or more nodes in one or more hierarchical levels, wherein a test case is a set of conditions under which a tester can determine whether an application is functioning as designed;

determining, by one or more computer processors, based, at least in part, on the snapshot, a plurality of parameters for the test case in the collaborative software development environment; and calculating, by one or more computer processors, based, at least in part, on the plurality of parameters, an importance value of the test case, wherein the importance value is used to determine an importance of the test case relative to one or more other test cases and wherein calculating the importance value of the test case includes calculating an importance value at each of the one or more nodes of the one or more hierarchical levels, and wherein calculating the importance value at each of the one or more nodes of the one or more hierarchical levels includes consideration of a normalization factor accounting for a degree of variance and a multiplication factor accounting for a distance of the one or more nodes from the test case.

2. The method of claim 1, wherein the importance value at each of the one or more nodes of the one or more hierarchical levels includes an importance value of at least one upstream node.

3. The method of claim 1, further comprising storing, by one or more computer processors, the importance value of the test case.

4. The method of claim 1, wherein calculating, based, at least in part, on the plurality of parameters, an importance value of the test case, further comprises:

determining, by one or more computer processors, whether one or more additional nodes are added to the collaborative software development environment;

determining, by one or more computer processors, a plurality of parameters for the one or more additional nodes; and calculating, by one or more computer processors, the importance value of the test case, based, at least in part, on the plurality of parameters for the one or more nodes and the plurality of parameters for the one or more additional nodes.

5. The method of claim 1, wherein the plurality of parameters includes at least two sets of attributes, and wherein one of the at least two sets includes constant attributes.

6. The method of claim 1, wherein the plurality of parameters for the test case in the collaborative software development environment include at least one of primary parameters having a direct impact on the test case, secondary parameters having an indirect impact on the test case, and tertiary parameters, having an environmental impact on the test case.

7. The method of claim 1, wherein the plurality of parameters includes at least a set of constant attributes and a set of dynamic attributes.

8. The method of claim 1, wherein the importance value calculated at each of the one or more hierarchical levels is linked to each other importance value.

* * * * *